United States Patent
Kato et al.

(10) Patent No.: US 7,872,362 B2
(45) Date of Patent: Jan. 18, 2011

(54) VEHICLE-USE POWER SUPPLY CONTROL APPARATUS

(75) Inventors: Minoru Kato, Toyota (JP); Takashi Senda, Toyota (JP)

(73) Assignee: Denso Corporation, Kariya (JP)

( * ) Notice: Subject to any disclaimer, the term of this patent is extended or adjusted under 35 U.S.C. 154(b) by 486 days.

(21) Appl. No.: 12/120,437

(22) Filed: May 14, 2008

(65) Prior Publication Data

US 2008/0284384 A1 Nov. 20, 2008

(30) Foreign Application Priority Data

May 17, 2007 (JP) ............................... 2007-132082

(51) Int. Cl.
- *F02D 29/06* (2006.01)
- *H02P 9/04* (2006.01)
- *H02P 11/00* (2006.01)
- *H02P 9/00* (2006.01)
- *H02H 7/06* (2006.01)
- *H02J 7/00* (2006.01)
- *B60L 1/00* (2006.01)
- *B60L 3/00* (2006.01)

(52) U.S. Cl. ........................ 290/40 C; 322/22; 320/118; 320/132; 307/10.1; 318/139; 123/179.3

(58) Field of Classification Search ............... 290/40 C; 322/22; 320/118, 132; 307/10.1; 318/139; 123/179.3

See application file for complete search history.

(56) References Cited

U.S. PATENT DOCUMENTS

| | | | |
|---|---|---|---|
| 3,793,544 A * | 2/1974 | Baumgartner et al. | 320/123 |
| 3,984,669 A * | 10/1976 | Lehmann et al. | 708/405 |
| 4,045,718 A * | 8/1977 | Gray | 320/123 |
| 4,672,294 A * | 6/1987 | Norton | 320/123 |
| 5,416,686 A * | 5/1995 | Azuma et al. | 363/37 |
| 5,488,283 A * | 1/1996 | Dougherty et al. | 307/10.1 |
| 5,717,310 A * | 2/1998 | Sakai et al. | 307/10.1 |
| 5,796,175 A * | 8/1998 | Itoh et al. | 307/10.1 |
| 5,899,411 A * | 5/1999 | Latos et al. | 244/53 A |
| 6,018,233 A * | 1/2000 | Glennon | 322/22 |
| 6,037,752 A * | 3/2000 | Glennon | 322/22 |
| 6,049,190 A * | 4/2000 | Canter et al. | 320/101 |

(Continued)

FOREIGN PATENT DOCUMENTS

JP 6-296332 10/1994

*Primary Examiner*—T. C. Patel
*Assistant Examiner*—Pedro J Cuevas
(74) *Attorney, Agent, or Firm*—Nixon & Vanderhye PC

(57) ABSTRACT

The vehicle-use power supply control apparatus includes a first battery supplying electric power to a load, an alternator driven by a vehicle engine, a second electric accumulator parallel-connected to the first battery, an electric power converter performing two-way power transmission between the first and second batteries, and a power supply control unit. The power supply control includes a function of setting a target power generation efficiency index, a function of setting a target power generation amount of the alternator on the basis of the target power generation efficiency index, while referring to a map defining relationship between a power generation efficiency index and a power generation amount of the alternator, and a function of controlling an amount and a transmission direction of transmission power of the electric power converter in order that an amount of electric power generated by the alternator becomes equal to the target power generation amount.

4 Claims, 4 Drawing Sheets

U.S. PATENT DOCUMENTS

| | | | |
|---|---|---|---|
| 6,151,222 A * | 11/2000 | Barrett | 363/16 |
| 6,167,339 A * | 12/2000 | Pels | 701/54 |
| 6,181,101 B1 * | 1/2001 | Arai et al. | 320/104 |
| 6,191,558 B1 * | 2/2001 | Arai et al. | 320/132 |
| 6,271,645 B1 * | 8/2001 | Schneider et al. | 320/118 |
| 6,275,004 B1 * | 8/2001 | Tamai et al. | 320/118 |
| 6,323,608 B1 * | 11/2001 | Ozawa | 318/139 |
| 6,583,602 B2 * | 6/2003 | Imai et al. | 320/118 |
| 6,608,396 B2 * | 8/2003 | Downer et al. | 290/40 C |
| 6,683,389 B2 * | 1/2004 | Geis | 290/40 C |
| 6,900,624 B2 * | 5/2005 | Abo | 323/284 |
| 6,909,201 B2 * | 6/2005 | Murty et al. | 307/10.1 |
| 6,989,653 B2 * | 1/2006 | Iwata et al. | 320/134 |
| 7,030,511 B2 * | 4/2006 | Zarei | 307/39 |
| 7,267,090 B2 * | 9/2007 | Tamai et al. | 123/179.3 |
| 7,352,154 B2 * | 4/2008 | Cook | 320/116 |
| 7,425,769 B2 * | 9/2008 | Roh | 290/31 |
| 7,482,710 B2 * | 1/2009 | Ichinose et al. | 307/67 |
| 7,525,286 B2 * | 4/2009 | Wang | 320/133 |
| 7,576,443 B2 * | 8/2009 | Raju | 290/40 F |
| 7,791,292 B2 * | 9/2010 | Glasl et al. | 318/139 |
| 2005/0206343 A1 * | 9/2005 | Ichinose et al. | 320/126 |
| 2007/0113814 A1 * | 5/2007 | Tamai et al. | 123/179.3 |
| 2008/0093863 A1 * | 4/2008 | Roh | 290/38 R |
| 2008/0221755 A1 * | 9/2008 | Senda et al. | 701/36 |
| 2009/0273239 A1 * | 11/2009 | Goodnow et al. | 307/35 |
| 2009/0276644 A1 * | 11/2009 | Goodnow et al. | 713/310 |
| 2010/0143812 A1 * | 6/2010 | Kozu et al. | 429/428 |
| 2010/0194355 A1 * | 8/2010 | Wada et al. | 322/22 |

* cited by examiner

VEHICLE-USE POWER SUPPLY CONTROL APPARATUS

CROSS-REFERENCE TO RELATED APPLICATION

This application is related to Japanese Patent Application No. 2007-132082 filed on May 17, 2007, the contents of which are hereby incorporated by reference.

BACKGROUND OF THE INVENTION

1. Field of the Invention

The present invention relates to a vehicle-use power supply control apparatus suitable for use in a vehicle such as a passenger car, a truck and a bus.

2. Description of Related Art

There is known a vehicle-use power supply control apparatuses which includes an alternator driven by a vehicle engine, a battery, a capacitor parallel-connected to the battery, and a DC/DC converter connected between the capacitor and the battery to enable two-way power transmission therebetween. This vehicle-use power supply control apparatus is configured to supply regenerative power generated by the alternator when the vehicle is decelerating to the capacitor through the DC/DC converter to store the regenerative power on a temporary basis, and discharges this regenerative power through the DC/DC converter when the vehicle is accelerating. This makes it possible to reduce the power generation amount of the alternator, to thereby improve fuel economy of the engine. For more details, refer to Japanese Patent Application Laid-open No. 6-296332, for example.

Meanwhile, the generation voltage of the alternator of such a vehicle-use power supply control apparatus is controlled at a constant voltage by a regulator, while the torque of the alternator varies depending on power consumption of electrical loads operating on power supplied from the battery or the alternator. Accordingly, the conventional vehicle-use power supply control apparatus as described above has a problem in that it cannot efficiently improve the fuel economy of the engine (that is, the fuel economy of the vehicle), because the alternator does not necessarily operate at a desirable power generation torque within a range in which the power generation efficiency of the alternator is high.

SUMMARY OF THE INVENTION

The present invention provides a vehicle-use power supply control apparatus comprising:

a first electric accumulator for supplying electric power to a load;

an alternator driven by a vehicle engine to generate electric power to be supplied to the load and the first electric accumulator;

a second electric accumulator parallel-connected to the first electric accumulator;

an electric power converter capable of performing two-way power transmission between the first and second electric accumulators; and a power supply control unit including a first function of setting a target power generation efficiency index of the alternator, a second function of setting a target power generation amount of the alternator on the basis of the target power generation efficiency index set by the first function, while referring to a map defining a relationship between a power generation efficiency index and a power generation amount of the alternator, and a third function of controlling an amount and a transmission direction of transmission power of the electric power converter in order that an amount of electric power generated by the alternator becomes equal to the target power generation amount.

According to the present invention, it is possible to provide a vehicle-use power supply control apparatus that can more efficiently improve fuel economy of a vehicle than the conventional vehicle-use power supply control apparatuses.

Other advantages and features of the invention will become apparent from the following description including the drawings and claims.

PREFERRED EMBODIMENTS OF THE INVENTION

Figure 1:
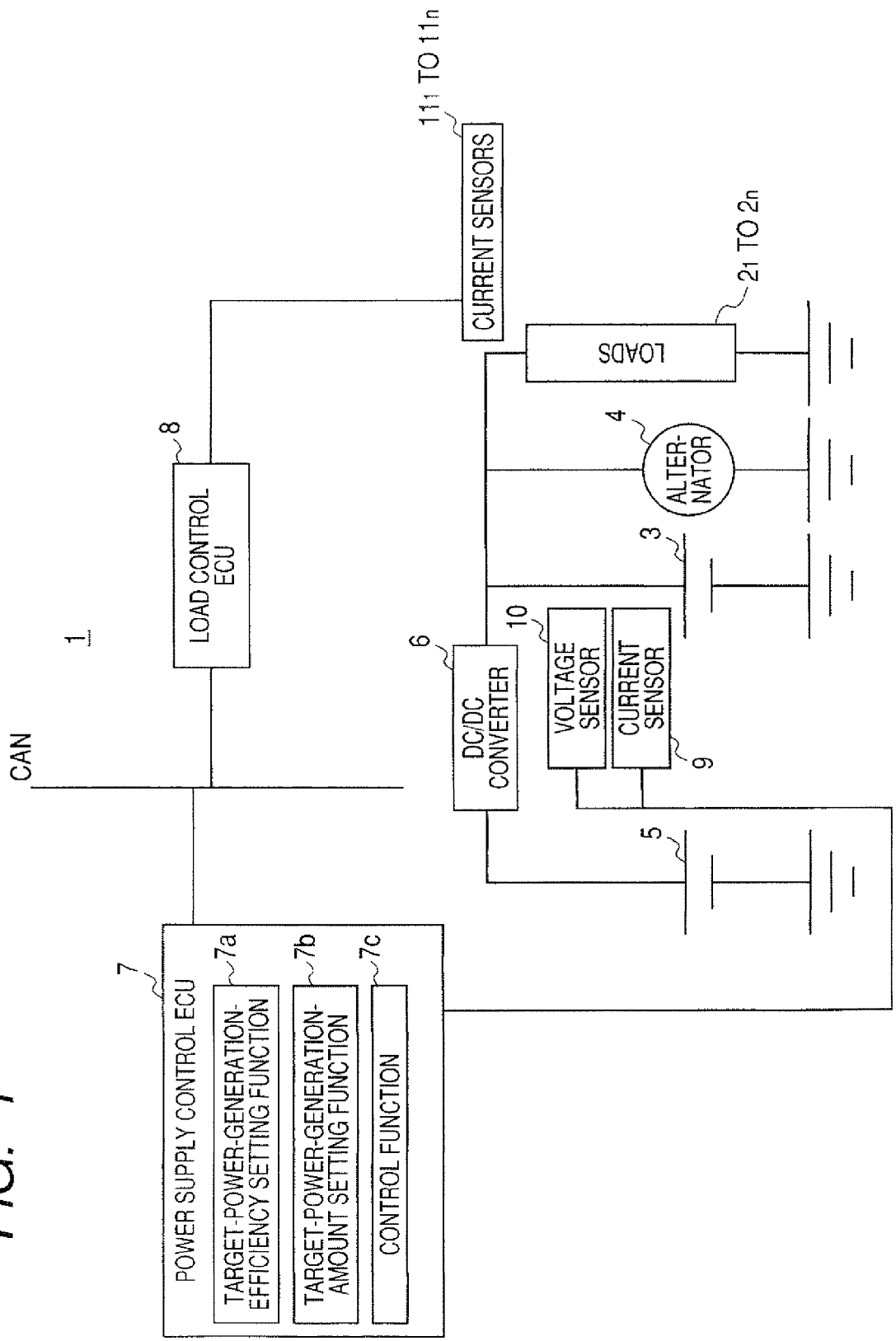
FIG. 1 is a schematic diagram showing a vehicle-use power generation control apparatus according to an embodiment of the invention.

FIG. 1 is a schematic diagram showing a vehicle-use power generation control apparatus 1 according to an embodiment of the invention.

As shown in FIG. 1, the vehicle-use power generation control apparatus 1 includes a battery 3 as a first electric accumulator for supplying power to loads $2_1$ to $2_n$ (n being an integer larger than 1), an alternator 4 driven by a vehicle engine (not shown) to generate power to be supplied to the battery 3 and the loads $2_1$ to $2_n$, a battery 5 as a second electric accumulator parallel-connected to the battery 3, a DC/DC converter 6 enabling two-way power transmission between the battery 5 and the battery 3, a power supply control ECU (Electronic Control Unit) 7 which operates to control the alternator 4 and the DC/DC converter 6, a load control ECU which operates to control the loads $2_1$ to $2_n$, a voltage sensor 9 detecting a voltage of the battery 3, a current sensor 10 detecting a discharge current of the battery 3, and current sensors $11_1$ to $11_n$ detecting respective load currents of the loads $2_1$ to $2_n$.

The power supply control ECU 7 and the load control ECU 8 are connected to each other in accordance with a given communication standard such as CAN (Controller Area Network).

The battery 3 is a lead-acid battery parallel-connected to the loads $2_1$ to $2_n$ for supplying power thereto. The remaining capacity, or SOC (State Of Charge) of the battery 3 is controlled by the alternator 4.

The alternator 4, which is an electric generator driven by a vehicle engine (not shown) to generate electric power to be supplied to the loads 21 to 2n and the battery 3. The power generation voltage of the alternator 4 is controlled at a constant voltage by the power supply ECU 7. Although not shown in the drawing, the alternator 4 includes a three-phase armature coil, a three-phase full wave rectifier, a field coil, a transistor which is PWM-controlled in accordance with a command signal received from the power supply control ECU 7 to supply the field coil with an excitation current corresponding to a command value indicative of the power generation voltage, and a flywheel diode parallel-connected to the field coil allowing a surge current caused when the transistor is turned off to pass therethrough.

The battery 5, which has an internal resistance smaller than that of the battery 3, is a nickel hydride battery. The remaining capacity, or SOC of the battery 5 is controlled by the DC/DC converter 6.

The DC/DC converter 6, which is a power transforming device capable of performing two-way power transmission, is mainly constituted by a flyback transformer, MOSFETs, diodes, and capacitors. The DC/DC converter 6 is configured to control a current flowing through the primary winding of the flyback transformer by PWM-controlling the MOSFETs to generate an AC voltage across the secondary winding of the flyback transformer whose amplitude is proportional to the winding ration between the primary and secondary windings, to rectify the generated AC voltage to generate a DC power, and to transmit the DC power in the direction from the battery 3 to the battery 5 or in the direction from the battery 5 to the battery 3.

The power supply control ECU 7, which includes a CPU, a ROM, a RAM, and a data bus connecting these components, implements a target-power-generation-efficiency-index setting function 7a, a target-power-generation-amount setting function 7b, and a control function 7c which are explained later, by executing a program stored in the ROM.

The load control ECU 8, which includes a CPU, a ROM, a RAM, and a data bus connecting these components, performs an operation to detect the currents $I_1$ to $I_n$ of the respective loads $2_1$ to $2_n$ by use of the current sensors $11_1$ to $11_n$, and calculate the power consumption W3=Vb×Σ $11_1$ to $11_n$ of the loads $2_1$ to $2_n$ on the basis of the detected currents $I_1$ to $I_n$, and the voltage Vb of the battery 3 obtained from the power supply control ECU through the CAN, the power supply control ECU 7 detecting this voltage Vb by use of the voltage sensor 9.

Figure 2:
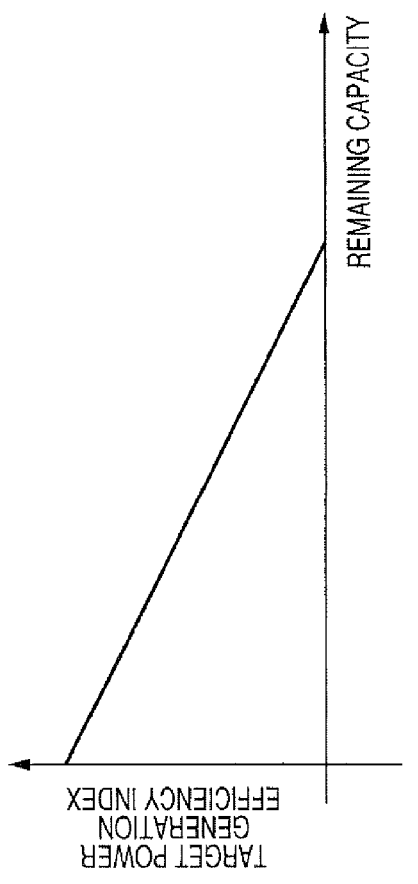
FIG. 2 to FIG. 5 are diagrams each showing a map which the vehicle-use power generation control apparatus uses for its control operation.

The target-power-generation-efficiency-index setting function 7a of the power supply control ECU 7 detects and integrates the charge/discharge current of the battery 3 by use of the current sensor 10 to estimate the remaining capacity of the battery 3, and sets a target power generation efficiency index by use of a map show in FIG. 2, which defines a relationship between the estimated remaining capacity of the battery 3 and the target power generation efficiency index.

Figure 3:
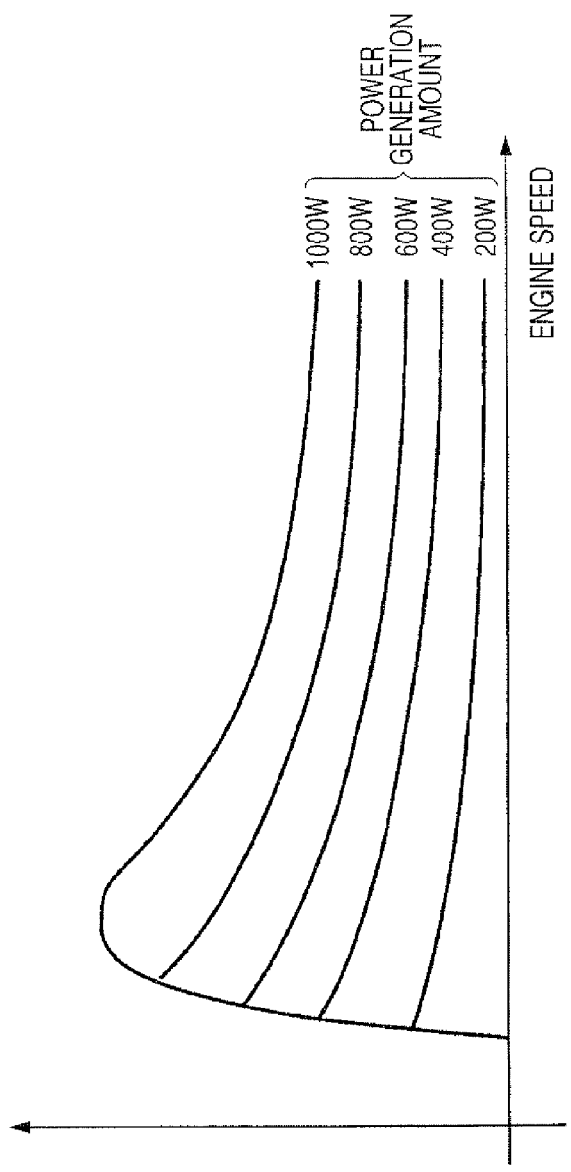

The target-power-generation-amount setting function 7b of the power supply control ECU 7 calculates power generation torque of the alternator 4 at each power generation point determined by the engine speed (the rotation speed of the vehicle engine driving the alternator 4) and the power generation amount of the alternator 4, by use of a map shown in FIG. 3, which shows a relationship among the engine speed, power generation torque of the alternator 4 and the power generation amount of the alternator 4. Thereafter, the target-power-generation-amount setting function 7b calculates, by use of a map shown in FIG. 4, which shows a relationship between the power generation torque of the alternator 4 and fuel consumption of the engine, an amount of fuel needed to generate power at each power generation point to determine an amount of fuel needed to generate unit electric power, that is, to determine the power generation efficiency index at each power generation point. The target-power-generation-amount setting function 7b prepares a map shown in FIG. 5 showing a relationship between the power generation amount of the alternator 4 and the power generation efficiency index on the basis of the results of the above calculations.

Figure 5:
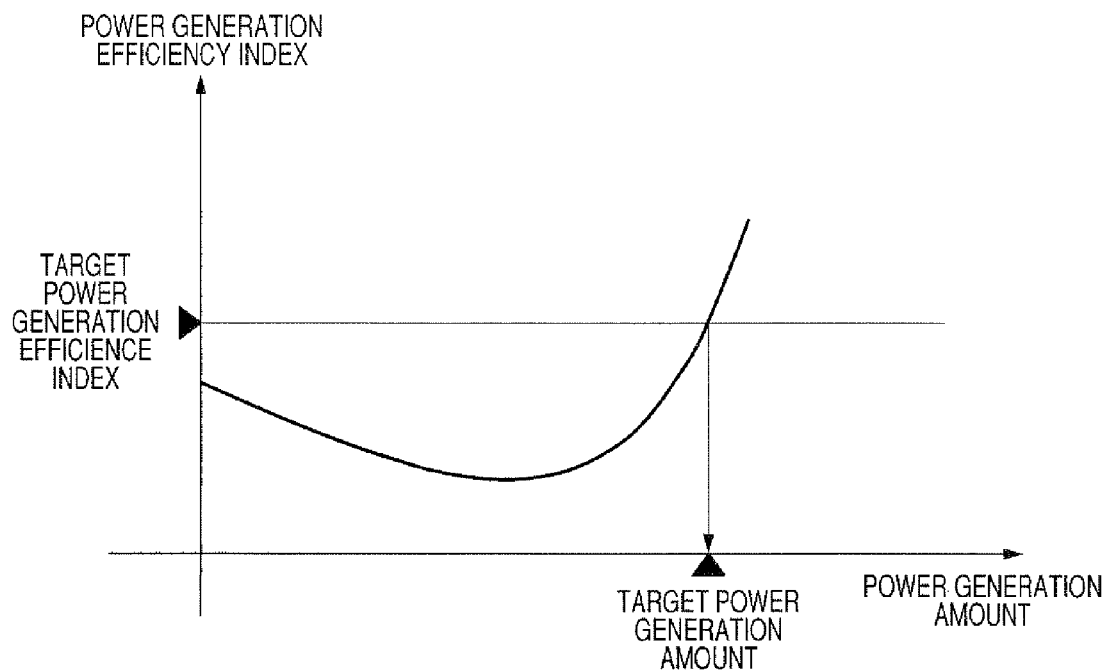

Also, the target-power-generation-amount setting function 7b sets a target power generation amount W2 by use of the map shown in FIG. 5. To be in more detail, the target-power-generation-amount setting function 7b sets, as the target power generation amount W2, an intersection point between a straight line corresponding to a given value of the target power generation amount index and a curve representing the power generation amount of the alternator 4. The control function 7c of the power supply control ECU 7 controls the amount and transmission direction of transmission power W1 of the DC/DC converter 6 in order that the power generation amount of the alternator 4 becomes equal to the target power generation amount W2 as described below.

The control function 7c obtains the power consumption W3 of the loads $2_1$ to $2_n$ from the load control ECU 8, and calculates a charging power W4 (=Vb×Ib) of the battery 3 on the basis of the voltage Vb of the battery 3 detected by the voltage sensor 9 and the current Ib of the battery 3 detected by the current sensor 10. The charging power W4 becomes negative when the battery 3 is discharging.

Also, the control function 7c calculates, as the transmission power W1 of the DC/DC converter 6, the target power generation amount W2 of the alternator 4 less the sum of the power consumption W3 of the loads $2_1$ to $2_n$ and the charging power W4 of the battery 3.

If the transmission power W1 (=W2−(W3+W4))) is positive, the transmission of electric power is performed in the direction from the battery 3 to battery 5, while if it is negative, the transmission of electric power is performed in the direction from the battery 5 to battery 3.

Next, the control operation of the vehicle-use power supply control apparatus 1 having the above described structure is explained with reference to the flowchart shown in FIG. 6

Figure 6:
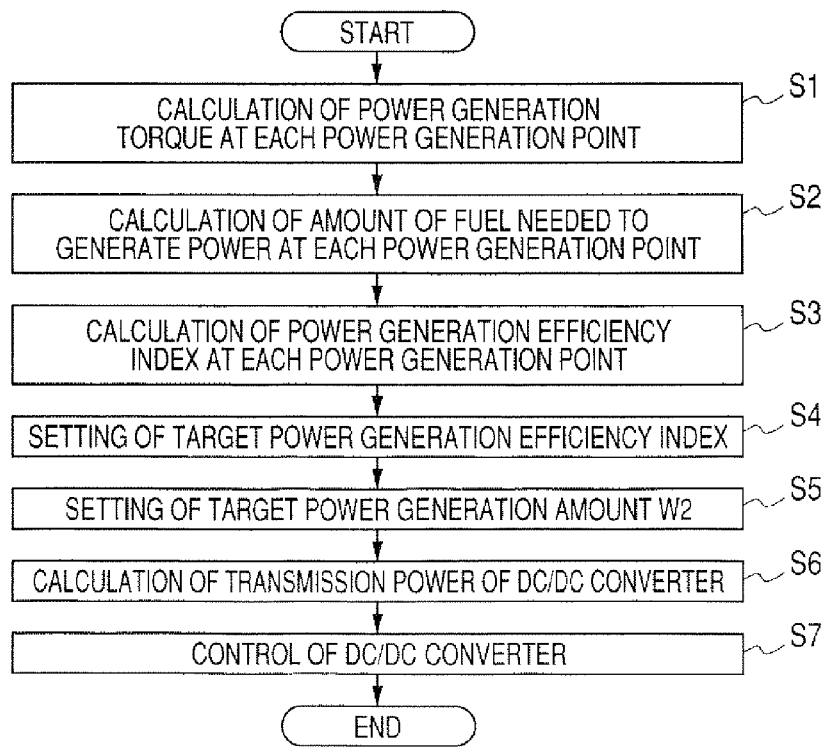
FIG. 6 is a flowchart showing a control operation of the vehicle-use power generation control apparatus.

As shown in FIG. 6, when the control operation starts, the target-generation-power-amount setting function 7b of the power supply control ECU 7 calculates, at step S1, the power generation torque of the alternator 4 at each power generation point determined by the engine speed and the power generation amount of the alternator 4, by referring to the map shown in FIG. 3, which shows the relationship among the engine speed, power generation torque, and the power generation amount.

Figure 4:
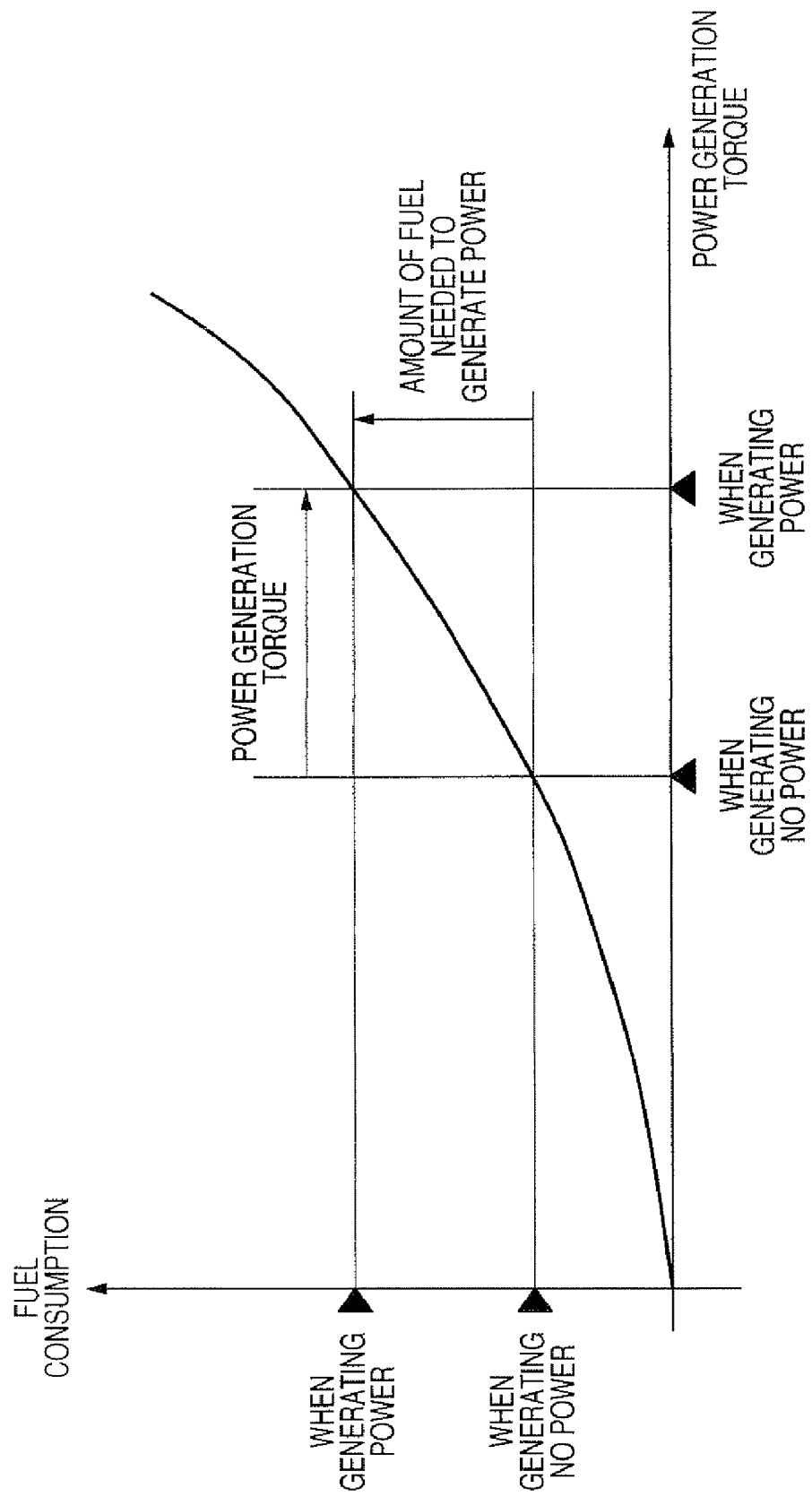

At subsequent step S2, the target-generation-power-amount setting function 7b calculates the amount of fuel needed to generate power at each power generation point by referring to the map shown in FIG. 4, which shows the relationship between the power generation torque of the alternator 4 and the fuel consumption of the engine. At step S3, the amount of fuel needed to generate unit electric power, that is, the power generation efficiency index at each power generation point is calculated to prepare the map shown in FIG. 5, which shows the relationship between the power generation amount of the alternator 4 and the power generation efficiency index.

At step S4, the target-power-generation-efficiency-index setting function 7a of the power supply control ECU 7 detects and integrates the charge/discharge current of the battery 3 by use of the current sensor 10 to estimate the remaining capacity of the battery 3, and sets the target power generation efficiency index by use of the map shown in FIG. 2, which defines the relationship between the remaining capacity of the battery 3 and the target power generation efficiency index.

At step S5, the target-generation-power-amount setting function 7b sets the target power generation amount W2 of the alternator 4 by use of the map shown in FIG. 5, which defines the relationship between the power generation amount of the alternator 4 and the power generation efficiency index. At step S6, the control function 7c of the power supply control ECU 7 determines the amount and transmission direction of the transmission power of the DC/DC converter 6 in order that the power generation amount of the alternator 4 becomes equal to the target power generation amount W2.

To be in more detail, the control function 7c obtains the power consumption W3 of the loads 21 to 2n from the load control ECU 8, and calculates the charging power W4 of the battery 3 on the basis of the voltage Vb of the battery 3 detected by the voltage sensor 9 and the current Ib of the battery 3 detected by the current sensor 10. Subsequently, the control function 7c calculates, as the transmission power W1 (=W2−(W3+W4)) of the DC/DC converter 6, the target generation amount W2 less the sum of the power consumption W3 of the loads $2_1$ to $2_n$ and the charging current W4 of the battery 3. At step S7, the control function 7c controls the DC/DC converter 6 in accordance with the calculated transmission power W1.

The above described vehicle-use power supply control apparatus 1 provides the following advantages.

The target-power-generation-efficiency-index setting function 7a of the power supply control ECU 7 sets the target power generation efficiency on the basis of the remaining capacity of the battery 3. This makes it possible to satisfy both increasing the power generation efficiency of the alternator 4 and keeping the remaining capacity of the battery 3 above a level enabling stably supplying power to the loads $2_1$ to $2_n$.

The battery 5 has an internal resistance smaller than that of the battery 3. This makes it possible to increase the charging capacity and the discharging capacity of the battery 5 which the DC/DC converter 6 charges and discharges under control of the control function 7c of the power supply control ECU 7.

This also makes it possible to reduce the alienation between the target power generation amount W2 and an actual power generation amount of the alternator 4 when the control function 7c controls the amount and transmission direction of the transmission power of the DC/DC converter 6 such that the power generation amount of the alternator 4 becomes equal to the target power generation amount W2.

The control function 7c controls the transmission power W1 of the DC/DC converter 6 with regard to the power consumption W3 of the loads $2_1$ to $2_n$, and the charging power W4 of the battery 3. This makes it possible to easily control the amount and transmission direction of the transmission power W1 of the DC/DC converter 6 in order that the power generation amount of the alternator 4 becomes equal to the target power generation amount W2, because the power consumption W3 of the loads $2_1$ to $2_n$ and the charging power W4 of the battery 3 are parameters easy to detect or estimate.

That is, to control the power generation amount of the alternator 4 at the target power generation amount W2, if there is margin in the power generation capacity of the alternator 4 to cover the sum of the power consumption W3 of the loads $2_1$ to $2_n$ and the charging power W4 of the battery 3, electric power is transmitted from the battery 3 to the battery 5 through the DC/DC converter 6, and if the power generation capacity of the alternator 4 is insufficient to cover the sum of the power consumption W3 of the loads $2_1$ to $2_n$ and the charging power W4 of the battery 3, electric power is transmitted from the battery 5 to the battery 3 through the DC/DC converter 6. This provides the advantage described below.

The control function 7c of the power supply control ECU 7 controls the amount and transmission direction of transmission power of the DC/DC converter 6 such that the power generation amount of the alternator 4 becomes equal to the target power generation amount W2, as a result of which the power generation amount of the alternator 4 can be kept at the power generation amount W2. In consequence, it becomes possible to cause the alternator 4 to generate power at a power generation torque within the range in which the power generation efficiency is high, and accordingly to improve fuel economy of the vehicle.

Since the only requirement to cause the alternator 4 to generate power at a power generation torque within the range in which the power generation efficiency is high is to add the DC/DC converter 6 and the battery 5 to the conventional power supply conventional apparatus, in-vehicle wiring design of the vehicle-use power generation control apparatus according to this embodiment is easy.

In the above embodiment, it is not needed to locate the DC/DC converter between the alternator 4 and the battery 3, or between the battery 3 and the loads $2_1$ to $2_n$. This prevents power supply certainty from being lowered, because any power converter constituted by semiconductor devices does not lie on the important power supply line.

In the above embodiment, if the transmission power W1 (=W2−(W3+W4)) is positive, the transmission of power is performed in the direction from the battery 3 to the battery 5, while if it is negative, the transmission of power is performed in the direction from the battery 5 to the battery 3. This makes it possible to stabilize power supplied to the loads $2_1$ to $2_n$ regardless of the power consumption W3 of the loads $2_1$ to $2_n$ and the charging power W4 of the battery 3. Accordingly, for example, the lighting fixtures mounted on the vehicle can be prevented from flickering.

According to the above embodiment, since it is not necessary to change the control operation for keeping the generation voltage of the alternator 4 at a constant value from the one in the conventional power supply control apparatus, the structures of the alternator 4 and the power supply control ECU can be prevented from becoming complicated.

It is a matter of course that various modifications can be made to the above described embodiment.

For example, although the power generation voltage of the alternator 4 is constant in the above embodiment, the power generation voltage may be increased when the vehicle is decelerating or running downhill if the alternator 4 is capable of regenerating energy, and the lighting fixtures do not flicker due to the increase of the power generation voltage, and may be reduced when the vehicle is accelerating if there is margin in the remaining capacity of the battery 3.

As the second electric accumulator (the battery 5), a nickel hydride battery is used in the above embodiment. However, an electric double layer capacitor may be used as the second electric accumulator.

In the above embodiment, the target-power-generation-amount setting function 7b of the power supply control ECU 7 prepares the map shown in FIG. 5, which shows the relationship between the power generation amount of the alternator 4 and the power generation efficiency index, on the basis of the map shown in FIG. 3, which shows the relationship among the engine speed, the power generation torque of the alternator, and the fuel consumption of the engine. However, the above embodiment may be modified so that the target-power-generation-amount setting function 7b stores the map shown in FIG. 5 prepared in advance.

The above explained preferred embodiments are exemplary of the invention of the present application which is described solely by the claims appended below. It should be understood that modifications of the preferred embodiments may be made as would occur to one of skill in the art

What is claimed is:

1. A vehicle-use power supply control apparatus comprising:

a first electric accumulator for supplying electric power to a load;

an alternator driven by a vehicle engine to generate electric power to be supplied to said load and said first electric accumulator;

a second electric accumulator parallel-connected to said first electric accumulator;

an electric power converter capable of performing two-way power transmission between said first and second electric accumulators; and a power supply control unit including a first function of setting a target power generation efficiency index of said alternator, a second function of setting a target power generation amount of said alternator on the basis of said target power generation efficiency index set by said first function, while referring to a map defining a relationship between a power generation efficiency index and a power generation amount of said alternator, and a third function of controlling an amount and a transmission direction of transmission power of said electric power converter in order that an amount of electric power generated by said alternator becomes equal to said target power generation amount.

2. The vehicle-use power supply control apparatus according to claim 1, wherein said first function sets said target power generation efficiency index depending on a remaining capacity of said first electric accumulator.

3. The vehicle-use power supply control apparatus according to claim 1, wherein an internal resistance of said second electric accumulator is smaller than an internal resistance of said first electric accumulator.

4. The vehicle-use power supply control apparatus according to claim 1, wherein said third function controls said amount of transmission power of said electric power converter with regard to a power consumption of said load and a charging power of said first electric accumulator.

* * * * *